(12) United States Patent
Ciminelli et al.

(10) Patent No.: US 8,118,406 B2
(45) Date of Patent: Feb. 21, 2012

(54) FLUID EJECTION ASSEMBLY HAVING A MOUNTING SUBSTRATE

(75) Inventors: Mario J. Ciminelli, Rochester, NY (US); James E. Vianco, Sr., Webster, NY (US); Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 319 days.

(21) Appl. No.: 12/573,273

(22) Filed: Oct. 5, 2009

(65) Prior Publication Data

US 2011/0080450 A1    Apr. 7, 2011

(51) Int. Cl.
*B41J 2/14* (2006.01)

(52) U.S. Cl. .......................................... 347/50

(58) Field of Classification Search .................... 347/47, 347/40, 42, 44, 49, 54, 56, 61, 65
See application file for complete search history.

(56) References Cited

U.S. PATENT DOCUMENTS

| 4,500,895 | A | * | 2/1985 | Buck et al. ..................... 347/40 |
| 7,350,902 | B2 | | 4/2008 | Dietl et al. |
| 2008/0149024 | A1 | | 6/2008 | Petruchik et al. |

* cited by examiner

*Primary Examiner* — Kristal Feggins
(74) *Attorney, Agent, or Firm* — David A. Novais

(57) ABSTRACT

The present invention relates to a fluid ejection assembly that includes an injection-molded mounting substrate that is formed by a two-shot injection molding process, wherein a housing portion of the mounting substrate is formed by a first shot molding, and a die-attach portion of the mounting substrate is formed within the housing portion by a second shot molding. The die-attach portion is made of a material having a low coefficient of thermal expansion along a direction that is parallel to a fluid passageway in the die attach portion.

20 Claims, 14 Drawing Sheets

FLUID EJECTION ASSEMBLY HAVING A MOUNTING SUBSTRATE

CROSS REFERENCE TO RELATED APPLICATION

Reference is made to commonly-assigned, U.S. patent application Ser. No. 12/338,211 filed Dec. 18, 2008, entitled INJECTION MOLDED MOUNTING SUBSTRATE in the name of Brian G. Price incorporated herein by reference.

FIELD OF THE INVENTION

The present invention relates to a fluid ejection assembly that includes a mounting substrate for a fluid ejection device. The mounting substrate is made by utilizing two separate molding steps in a two-shot molding process.

BACKGROUND OF THE INVENTION

A mounting substrate for a fluid ejection device, such as an inkjet printhead, has conventionally been made by a single molding process which forms both the die-attach portion for the fluid ejection device(s), including the fluid feed channels or slots with lands there-between, and a housing portion including alignment and fastening features, such as bolt holes. The mounting substrate should be sufficiently strong that it does not deform during fabrication of the mounting substrate, during attaching of the fluid ejection device(s), during attaching of the mounting substrate to a printhead chassis, or during printhead operation. If the fluid ejection device(s) to be attached to die-attach portion have multiple fluid inlets that are spaced apart by about 2 millimeters or more center-to-center, use of a single molding process provides satisfactory results. Such multiple fluid inlets can, for example, be for providing different colored inks (e.g. cyan, magenta, yellow and black) to an inkjet printhead die having separate arrays of drop ejectors that are fed independently by the fluid inlets.

One way to reduce the cost of an inkjet printhead is to reduce the size of the fluid ejection device, i.e. the printhead die, which typically includes not only the fluid inlets and the arrays of drop ejectors, but also includes logic and switching electronics, as well as electrical interconnections. Due to advances in microelectronic fabrication processes, making the electronics on the die fit within a smaller space is now possible, so that the fluid inlets on the printhead die can be spaced as close together as 0.8 mm center-to-center or closer. The problem that remains is providing a mounting substrate having a die-attach portion with fluid feed slots at the same spacing as the fluid inlet spacing on the printhead die.

It is difficult to make fluid feed slots at a center-to-center spacing of less than one millimeter in a single injection molding process step and still provide sufficient strength in the mounting substrate. This is because for precision single-step injection molding processes, all wall thicknesses need to be substantially uniform. For example, for a center-to-center fluid feed slot spacing of 0.8 mm, the width of the slots and the widths of the lands between the slots can each be about 0.4 mm. This means that all walls that are injection molded in the same step should have approximately the same wall thickness as the lands, i.e. about 0.4 mm. It is found that such thin wall thickness may not provide a sufficiently strong, flat and stable mounting substrate.

Alternatively, if the walls or other features in the rest of mounting substrate were made substantially thicker than the lands between the slots, the molding material would not flow in a uniform manner to fill both the thick walls and the thin lands. As a result, the die-attach surface can warp, so that it is insufficiently flat to allow the printhead die to be adhesively attached with reliable fluid seals between adjacent fluid feed slots. In addition, there can be "knit lines" resulting from molding material flowing from both ends of the fluid feed slot and land region and meeting midway down the lands. Such knit lines are built-in discontinuities and stress concentrations which can lead to deformation and failure in the part.

Commonly assigned US Published Application No. 2008/0149024 (incorporated herein) discloses a printhead substrate arrangement in which the portion of the substrate that includes the fluid feed slots or channels is made from a ceramic material, while the remaining portion of the substrate arrangement is made by insert molding, i.e. by molding plastic material around the ceramic portion. This arrangement provides for a mounting surface that is flat and stable.

It is desirable to have a printhead substrate (i.e. a mounting substrate to which one or more printhead die can be attached) which costs less to produce. Additionally, it is further beneficial to have a printhead substrate where the widths of the fluid feed slots and the lands between the fluid feed slots are reduced to enable the overall reduction in the size of the corresponding printhead die to be attached. Ceramic is higher in cost than plastic. With ceramic, it is further difficult to provide for desired reduced center-to-center spacing of fluid feed slots, which enable the size the printhead substrate to be reduced. Accordingly, providing a low cost printhead substrate that includes reduced size fluid feed slots and lands there-between when using ceramic may be difficult.

The arrangement of commonly assigned US Published Patent Application 2008/0149024 provides for a mounting surface which is stable as noted above, flat (typically less deviation from flatness than 5 μm per inch), and has a relatively low coefficient of thermal expansion (CTE). The CTE of a material relates the change in temperature to the change in the material's linear dimensions. It is the fractional change in length per degree of temperature change. Depending on the type of ceramic material, the CTE is 4-10 parts per million per degree C. (4-10 ppm/° C.), which is a fairly good match for silicon printhead die commonly used in inkjet applications, having a CTE of about 3 ppm/° C. This is desirable because the stress induced on the silicon printhead die by mounting to the substrate is directly proportional to the difference in the CTE of the silicon die and the material used for the mounting substrate.

As noted above, drawbacks of using the ceramic insert molded substrate approach are cost (ceramic is relatively expensive) and the fact that there are size limitations on the slots widths and pitches (due to the manufacturing limitations of ceramic). The minimum slot to slot pitches typically achieved in a ceramic part made by a low cost powder compaction process are about 1.5 mm (0.7 mm wide slots with 0.8 mm thick walls). Smaller dimensions can be achieved with a ceramic injection molding process, but this will typically increase the cost of the part by about 2-4 times.

A lower cost approach would be to mold the substrate entirely out of plastic. This approach also allows for smaller slot widths and walls than a ceramic part (typically down to a pitch of 1 mm). However, a problem with this approach involves getting sufficient strength in the substrate to provide a stable die mounting surface. Injection molded parts need a uniform wall thickness to have uniform moldability. Since an inkjet device typically needs fairly close spacing of the fluid feed slots, this spacing will determine the maximum wall thickness. Another problem relates to controlling flatness on the die mounting surface of a plastic substrate which can be difficult because of the sink that occurs during the molding process. Although ceramic parts can be made very flat by a low-cost lapping or grinding operation, this cannot be easily done to a plastic part after injection molding, so it is advantageous to mold a plastic die mounting substrate in a way such that the as-molded surface is sufficiently flat. Finally, most plastics have high CTE's ($\approx$25-50 ppm/° C. depending on the type of material) which are much higher than silicon and as a result induce high stresses on the silicon printhead die.

Co-pending U.S. patent application Ser. No. 12/338,211 filed Dec. 18, 2008, incorporated herein by reference, discloses a 2-shot molded printhead substrate which uses the 2nd shot to achieve the close spacing of fluidic slots and the 1st shot to achieve thicker walls in the rest of the substrate to provide sufficient strength to provide a stable die mounting surface. However, what is needed is an arrangement and/or manufacturing method which addresses the CTE and die mounting surface flatness issues noted above, which are commonly encountered when using a plastic substrate in a microelectronic packaging application like inkjet.

SUMMARY OF THE INVENTION

The present invention relates to a fluid ejection assembly that includes an injection-molded mounting substrate that is formed by a two-shot injection-molding process, wherein a housing portion of the mounting substrate is formed by a first shot of the two-shot molding process, and a fluid passageway portion of the mounting substrate is formed within the housing portion by a second shot of the two-shot molding process. In a feature of the present invention, the two-shot injection-molded mounting substrate of the present invention provides an attachment surface for a fluid ejection device at a surface of the fluid passageway portion that is formed by the second shot. In a further feature of the present invention, with the two-shot molding process it is possible to reduce the width of the fluid feed slots and the lands between the fluid feed slots of the fluid passageway portion of the mounting substrate so as to enable the attachment of a reduced size fluid ejection device. In a further feature of the present invention, a die attach portion of the substrate is made of a material having a low coefficient of thermal expansion along a direction that is parallel to a fluid passageway in the die attach portion to provide a low stress attachment of the fluid ejection device. In a still further feature of the present invention, an injection hole of the second shot of the two-shot molding process is sufficiently displaced from fluid passageways in the die attach portion in order to control the flatness of the die attach surface. The present invention further relates to a method of manufacturing the fluid ejection assembly and a method for manufacturing the mounting substrate for the fluid ejection assembly.

DETAILED DESCRIPTION OF THE INVENTION

The present description will be directed in particular to elements forming part of, or cooperating more directly with, an apparatus in accordance with the present invention. It is to be understood that elements not specifically shown or described may take various forms well known to those skilled in the art.

Figure 1:
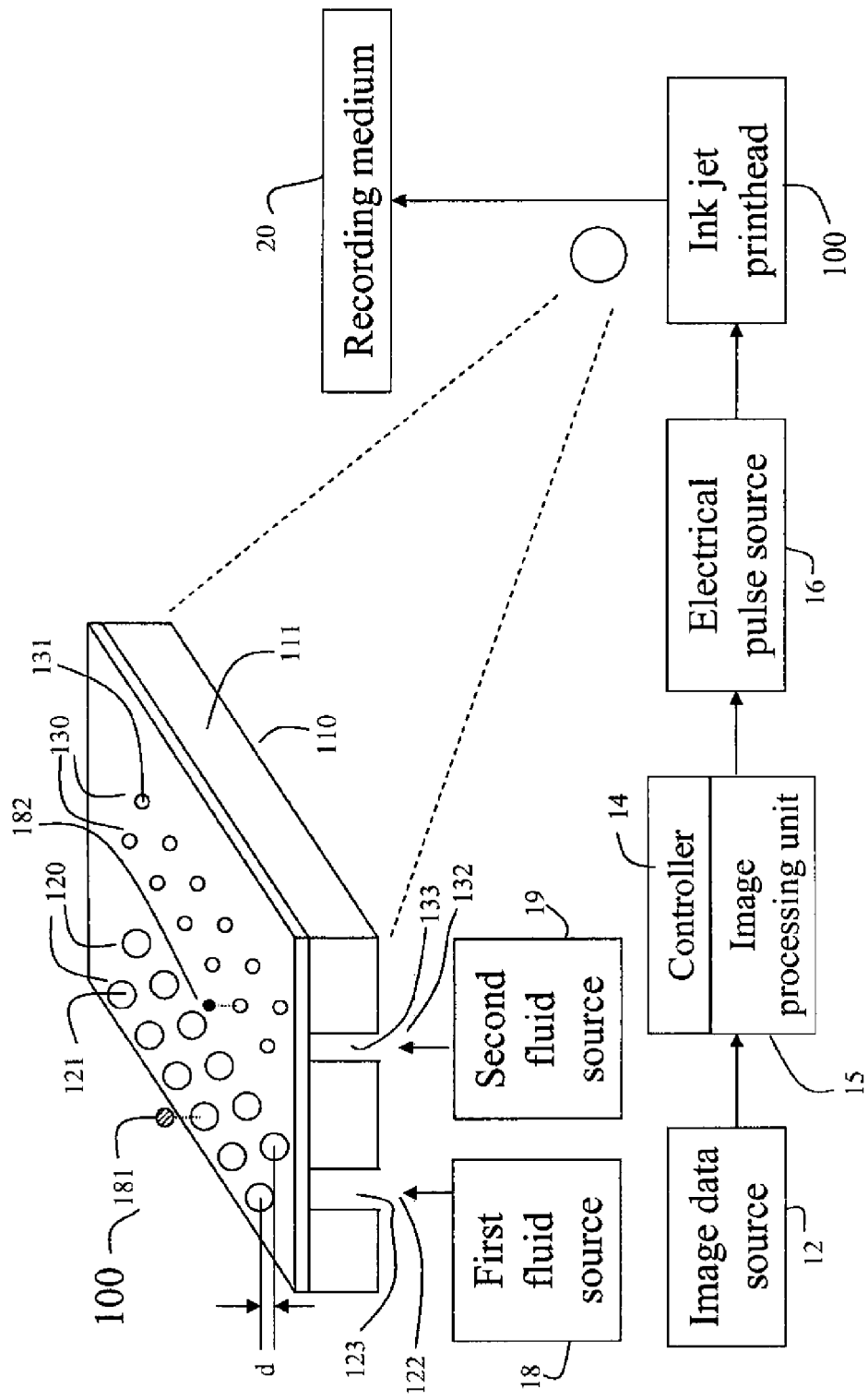
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110. An inkjet printhead die is an example of a fluid ejection device, and an inkjet printhead is an example of a fluid ejection assembly.

In the example shown in FIG. 1, there are two nozzle arrays. Nozzles or drop ejectors 121 in first nozzle array 120 have a larger opening area than nozzles or drop ejectors 131 in second nozzle array 130. In this example, each of the two nozzle arrays (120, 130) has two staggered rows of nozzles, each row having a nozzle density of 600 per inch. The effective nozzle density then in each array is 1200 per inch. If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of fluid delivery pathways 122 and 132 are shown in FIG. 1 as fluid inlets 123 and 133 respectively through printhead die substrate 111. One or more inkjet printhead die 110 will be included in inkjet printhead 100, but for greater clarity only one inkjet printhead die 110 is shown in FIG. 1. The printhead die are arranged on a support member as discussed below relative to FIG. 2. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to nozzles in the first nozzle array 120 and the second nozzle array 130 via ink delivery pathways 122 and 132 respectively. Also, in some embodiments, fewer than two or more than two nozzle arrays may be included on printhead die 110. In some embodiments, all nozzles on inkjet printhead die 110 may be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. The term drop ejector is sometimes used to refer to the drop forming mechanism plus the nozzle. An array of drop ejectors has a corresponding array of nozzles, and sometimes herein drop ejector arrays will be interchangeably referred to as nozzle arrays. During operation, droplets of ink are ejected by the drop ejector arrays and deposited on a recording medium 20.

Figure 2:
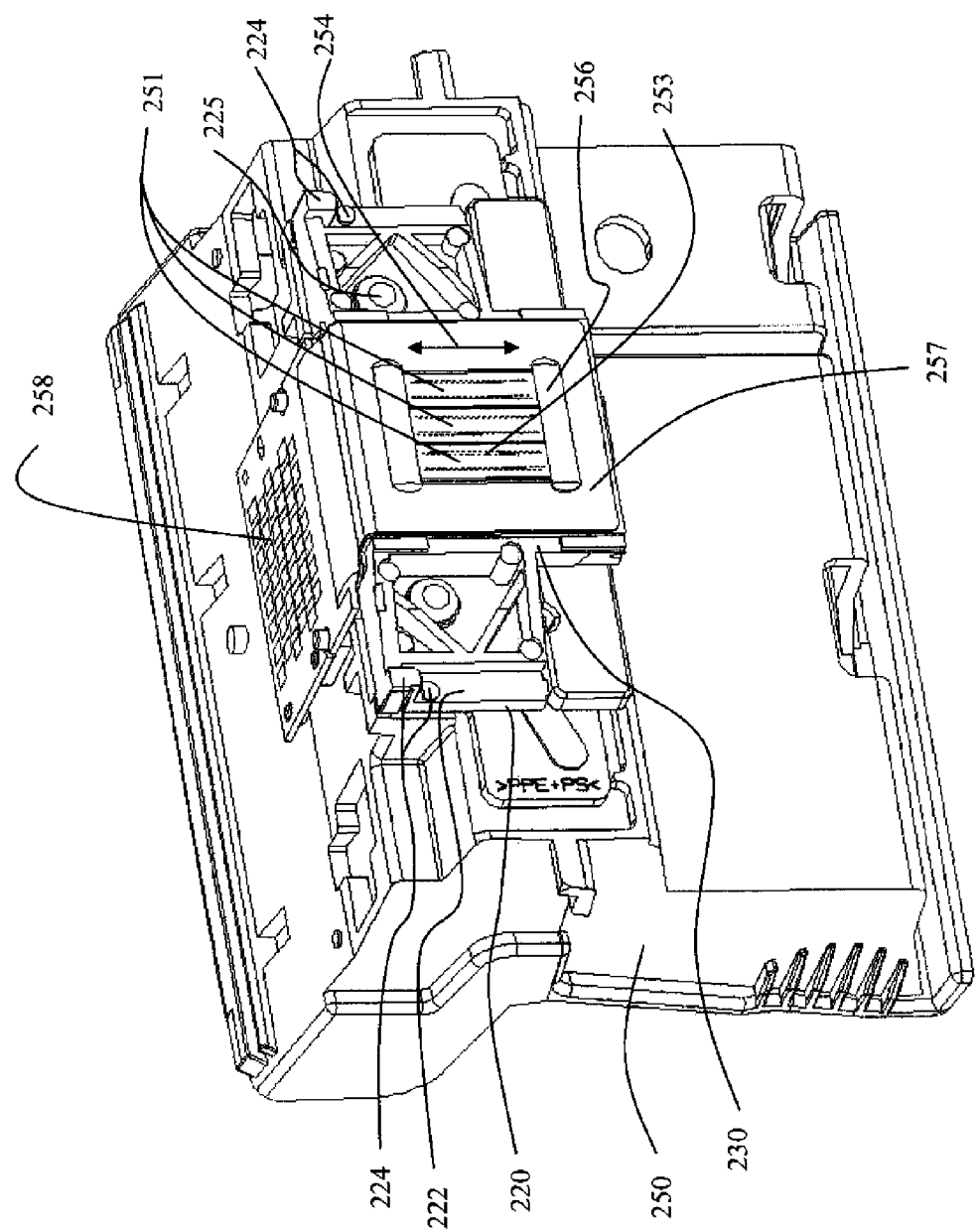
FIG. 2 is a perspective view of a portion of a printhead chassis.

FIG. 2 (similar to FIG. 9 of US Published Application No. 2008/0149024) shows a perspective view of a portion of a printhead chassis 250, which is an example of an inkjet printhead 100. Printhead chassis 250 includes three printhead die 251 (similar to printhead die 110), each printhead die 251 containing two nozzle arrays 253, so that printhead chassis 250 contains six nozzle arrays 253 altogether. The six nozzle arrays 253 in this example may be each connected to separate ink sources (not shown in FIG. 2); such as cyan, magenta, yellow, text black, photo black, and a colorless protective printing fluid. Each of the six nozzle arrays 253 is disposed along nozzle array direction 254.

The three printhead die 251 are shown in FIG. 2 as being attached to die-attach portion 230 of mounting substrate 220. The printhead die 251 are attached to die-attach portion 230 using an adhesive (not shown) that individually seals the fluid inlets (shown as 123 and 133 in FIG. 1) to corresponding fluid feed slots (not shown in FIG. 2) in die-attach portion 230, so that inks or other fluids from fluid sources 18 and 19 are separately fed and are not mixed together. Extending outwardly from die-attach portion 230 of mounting substrate 220 is housing portion 222. Housing portion 222 includes holes for bolts 225 for attaching mounting substrate 220 to printhead chassis 250. Housing portion 222 also includes alignment features 224, with respect to which printhead die 251 are placed on the die-attach portion 230. Alignment features 224 are also used to locate the printhead chassis against datum reference features in a carriage of a printer (not shown).

Also shown in FIG. 2 is a flex circuit 257 to which the printhead die 251 are electrically interconnected, for example, by wire bonding or tape automated bonding. The interconnections are covered by an encapsulant 256 to protect them. Flex circuit 257 is supported by the die-attach portion 230, bends around the side of printhead chassis 250 and connects to connector board 258. When printhead chassis 250 is mounted into the printer carriage (not shown), connector board 258 is electrically connected to a connector (not shown), so that electrical signals may be transmitted to the printhead die 251.

In commonly assigned U.S. Published Application No. 2008/0149024, the die-attach portion 230 (i.e. second portion 16 in the terminology of U.S. Published Application No. 2008/0149024) is made, for example, of a ceramic material that is insert molded into housing portion 222 (i.e. first portion 14 in U.S. Published Application No. 2008/0149024). Such an insert molded ceramic piece works well if the nozzle arrays 253 of printhead die 251 and their corresponding fluid inlets are spaced apart by a center-to-center distance of about one millimeter or more. However, using presently available ceramic fabrication technology, it is difficult to provide fluid feed slots at a center-to-center spacing of less than one millimeter.

Figure 3:
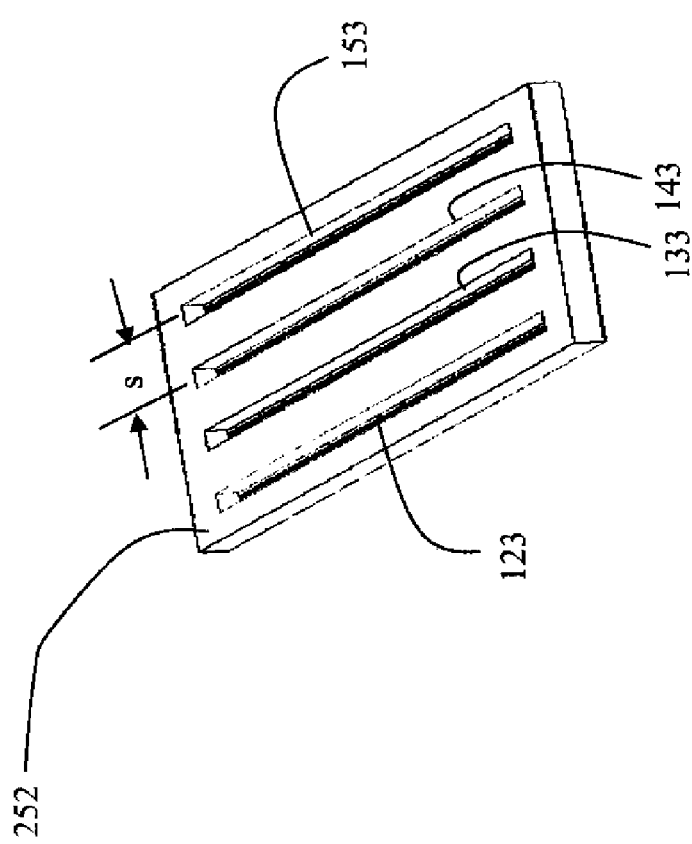
FIG. 3 is a schematic view of a printhead die.

FIG. 3 schematically shows a printhead die 252 that has four fluid inlets (also interchangeably referred to herein as ink inlet slots) 123, 133, 143 and 153 corresponding to first, second, third and fourth drop ejector arrays (not shown) respectively. Drop ejector arrays and associated logic and switching electronics are located between the fluid inlets, as well as beyond the outside fluid inlets 123 and 153. Compact design and fabrication of the electronics on printhead die 252 allows the center-to-center spacing "s" between adjacent fluid inlets to be less than one millimeter, for example 0.8 mm.

Figure 4:
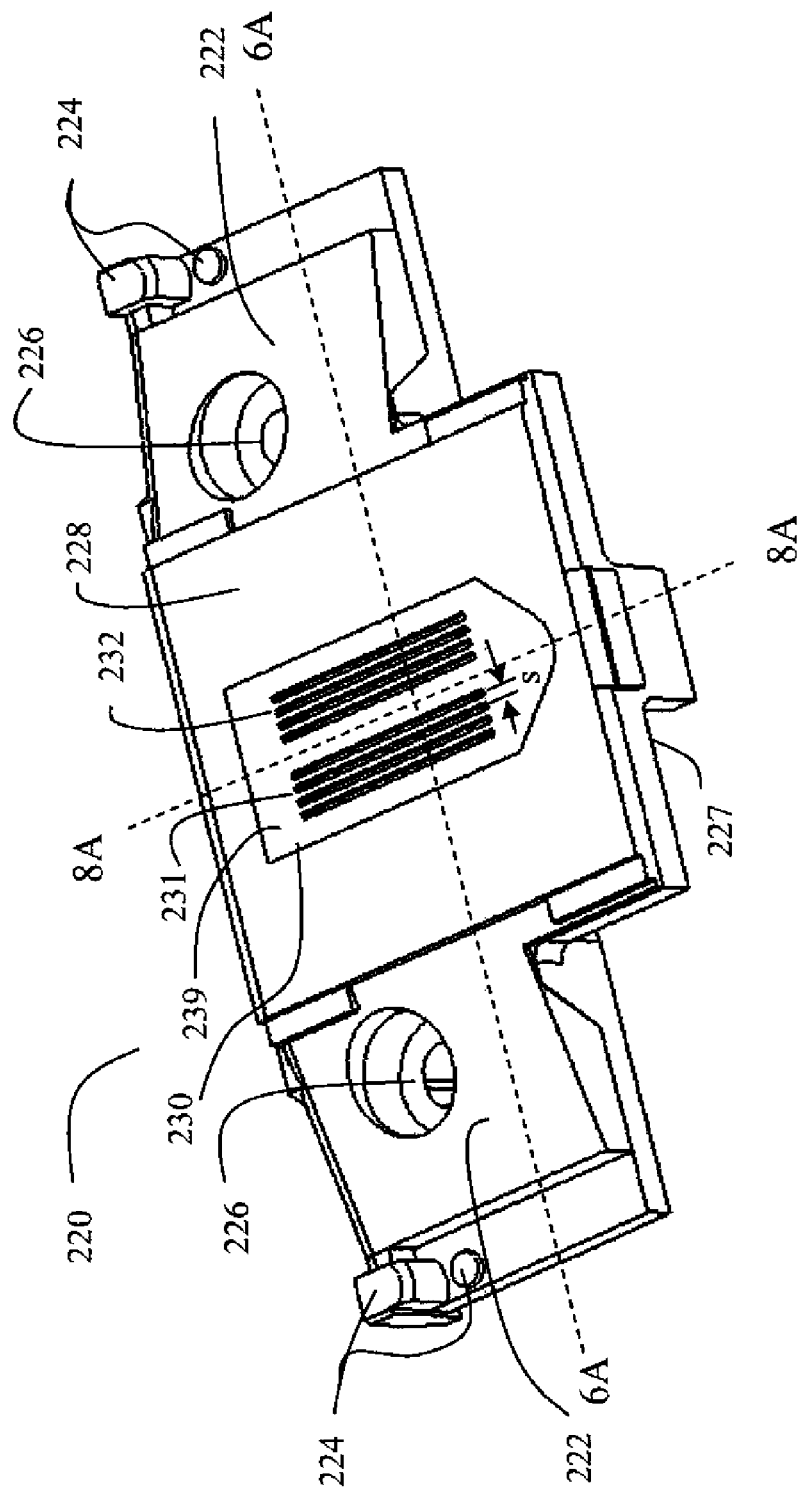
FIG. 4 is a perspective top view of a mounting substrate according to an embodiment of the present invention.

FIG. 4 shows a perspective view of a mounting substrate 220 according to an embodiment of the present invention. Mounting substrate 220 includes a housing portion 222 that extends outwardly from die-attach portion 230. Housing portion 222 includes alignment features 224 and bolt hole(s) 226, and is generally similar to the housing portion 222 shown in FIG. 2, except near die-attach portion 230. Housing portion 222 includes a first housing surface 228 (the top surface in the top view of FIG. 4) and a second housing surface 227 (the bottom surface that is hidden from view in FIG. 4). Die-attach portion 230 includes a first set of fluid feed slots 231 and a second set of fluid feed slots 232 in order to accommodate two printhead die 252 of the type shown in FIG. 3. Each set of fluid feed slots 232 and 233 has four fluid feed slots spaced at the same center-to-center spacing "s" as in printhead die 252 of FIG. 3, for example 0.8 mm. First and second sets of fluid feed slots 231 and 232 are the openings of fluid passageways (described below) at the die-attach surface 239 of die-attach portion 230. When printhead die 251 are subsequently mounted on mounting substrate 220, it is the die-attach surface 239 that the printhead die 251 are bonded to.

Mounting substrate 220 shown in FIG. 4 is made, for example, in a two-shot injection molding process. As is well known in the art of two-shot injection molding, a first molten material (e.g. a plastic resin) is injected through a first gate or first set of gates into a first cavity of a mold tool where the first cavity has the inverse shape of the features of the part to be made in the first shot. Then the part made in the first shot is moved to face a second cavity and a second molten material is injected through a second gate into the second cavity during the second shot step of the process to form or "overmold" the details corresponding to the second cavity onto the part made in the first shot step of the process.

Figure 5:
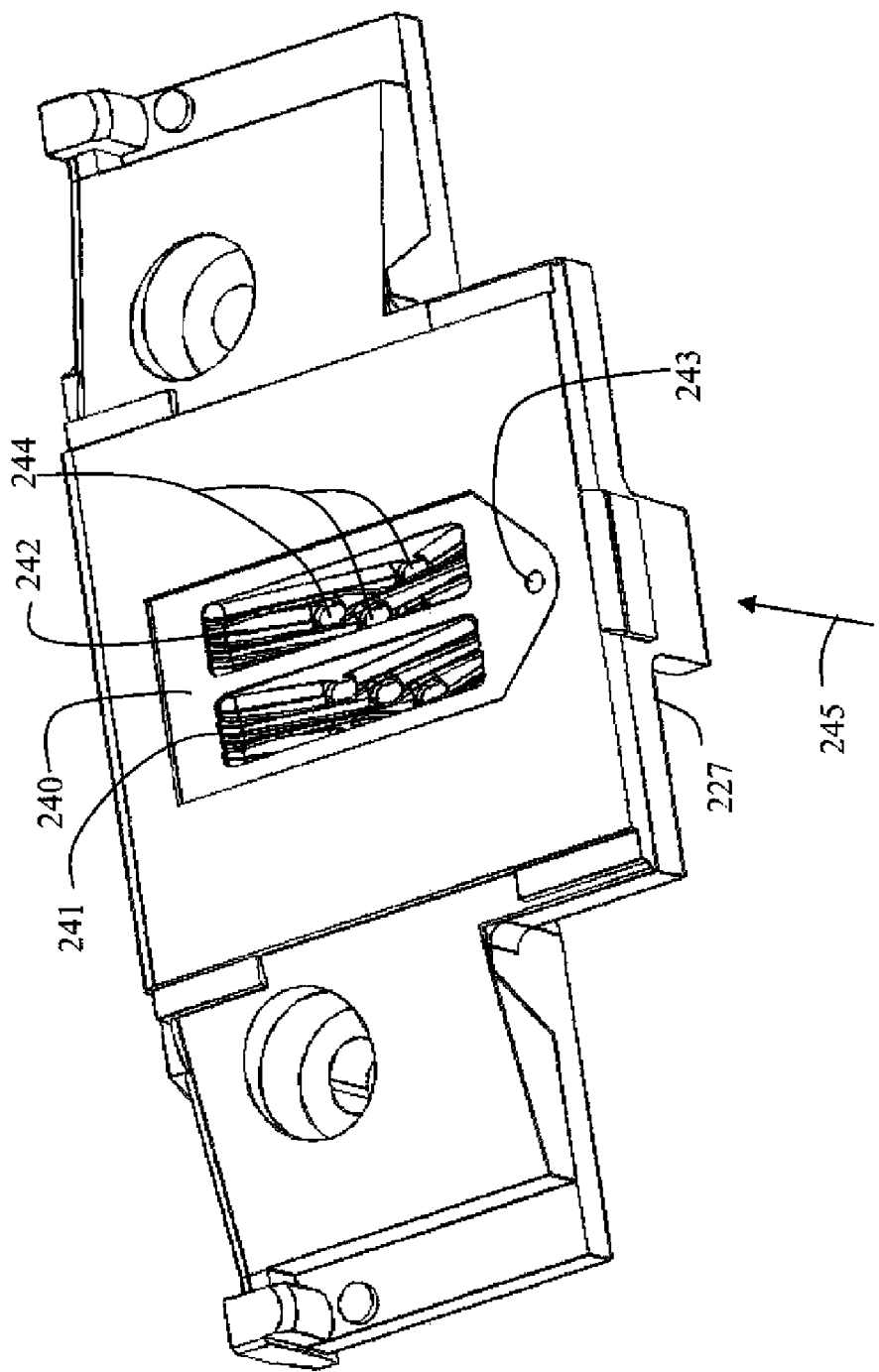
FIG. 5 is a perspective top view of the housing portion of the mounting substrate shown in FIG. 4.

In the first shot step of the two-shot injection molding process of mounting substrate 220, the housing portion 222 shown in FIG. 5 is made including the housing portion features described above relative to FIG. 4, as well as a recess 240 which is located in the region where die-attach portion 230 (not shown in FIG. 5) will be formed. Within recess 240 is an injection hole 243 and two subdivided indentations 241 and 242, corresponding respectively to the eventual positions of the first set of fluid feed slots 231 and the second set of fluid feed slots 232 shown in FIG. 4. The subdivided indentations 241 and 242 are each subdivided into four portions that merge into an elongated opening near the top surface of recess 240 (as viewed in FIG. 5), and lead to four separate holes 244, not all of which are visible in FIG. 5, and three of which are labeled within subdivided indentation 242 for clarity. There are no precision features in housing portion 222 having extensive thin walls, so housing portion 222 can be made with wall and feature thicknesses on the order of one to two millimeters.

In the second shot step of the two-shot injection molding process a molten material (e.g. a plastic resin) is injected through injection hole 243 from second housing surface 227 along injection direction 245 into recess 240 of housing portion 222 to form die-attach portion 230. The molten material flows into the recess 240 and into the two subdivided indentations 241 and 242. Blades and/or pins (not shown) within the second cavity of the mold tool limit the flow of the molten material within the two subdivided indentations 241 and 242 in order to form fluid passageways that exit the top surface of die-attach portion 230 as sets of fluid feed slots 231 and 232, as shown in FIG. 4. In some embodiments the mold tool is configured such that the resulting die-attach surface 239 of the die-attach portion 230 is substantially coplanar with the adjacent first housing surface 228 of the housing portion 222 (FIG. 4).

Figure 6:
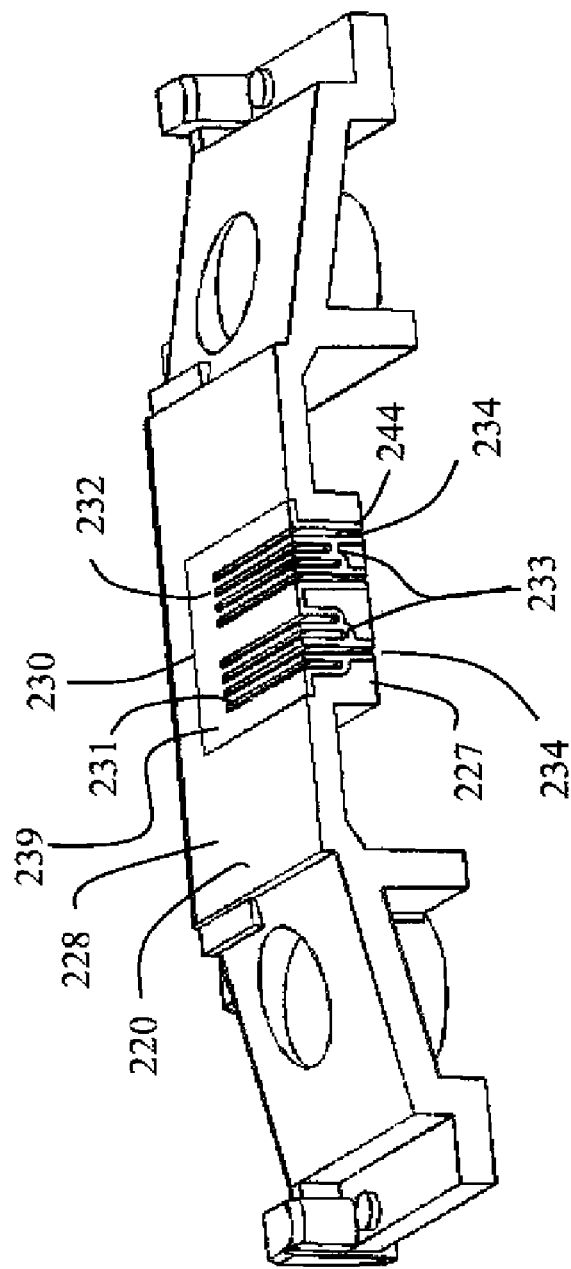
FIG. 6 is a cross-sectional view of the mounting substrate shown in FIG. 4.

FIG. 6 shows a cross-section of mounting substrate 220, with the cut line of the cross-section being along dashed line 6A-6A shown in FIG. 4. Because the die-attach portion 230 is made during a second shot within the recess 240 and the subdivided indentations 241 and 242, the fluid passageway portions 233 that exit the die-attach surface 239 of die-attach portion 230 as first and second sets of fluid feed slots 231 and 232 can be made with thin walls without compromising the strength of mounting substrate 220. Fluid passageway portions 233 exit the bottom side surface 227 of housing portion 222 at ink feed holes 234 that are located within holes 244 in the subdivided indentations 241 and 242 (with reference to FIG. 5). Because holes 244 and ink feed holes 234 are spaced along the length of first and second sets of fluid feed slots 231 and 232, the cross-sectional view of FIG. 6 only exposes three of the holes 244 and corresponding ink feed holes 234, not all of which are labeled for improved clarity in FIG. 6.

Figure 7:
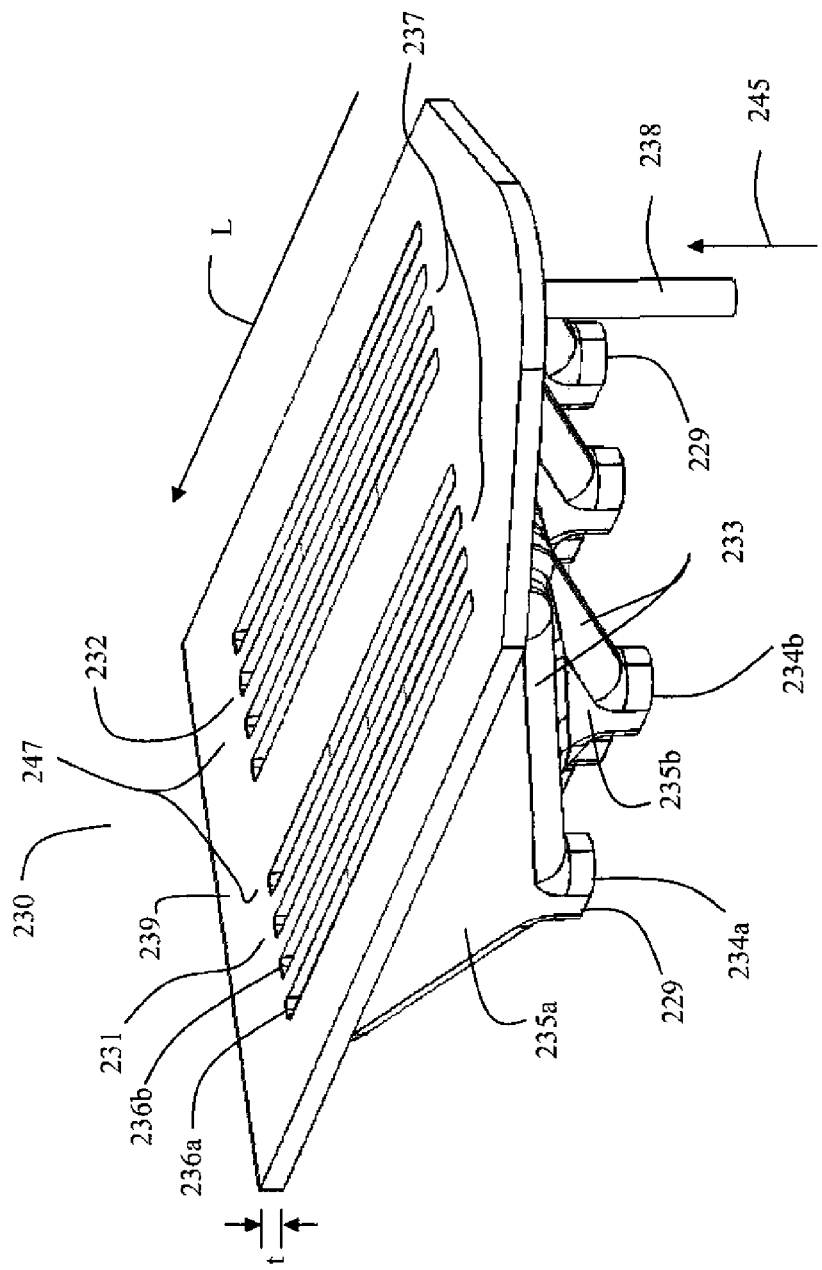
FIG. 7 is a perspective view of the die-attach portion of the mounting substrate shown in FIG. 4.

FIG. 7 shows a view of die-attach portion 230 as if housing portion 222 were invisible. Because die-attach portion 230 is molded as a second shot within housing portion 222, die-attach portion 230 never exists separately from housing portion 222, but the view of FIG. 7 further clarifies additional details. First set of fluid feed slots 231 includes a first fluid feed slot 236a and a second fluid feed slot 236b, which is adjacent to first fluid feed slot 236a. Fluid feed slots 236a and 236b are the exit portions of first passageway 235a and second passageway 235b respectively at the surface of die-attach portion 230. First passageway 235a and second passageway 235b taper along the length dimension L of the set of fluid slots 231, and lead to ink feed holes 234a and 234b respectively at a second surface 229 of die attach portion 230.

Figure 8:
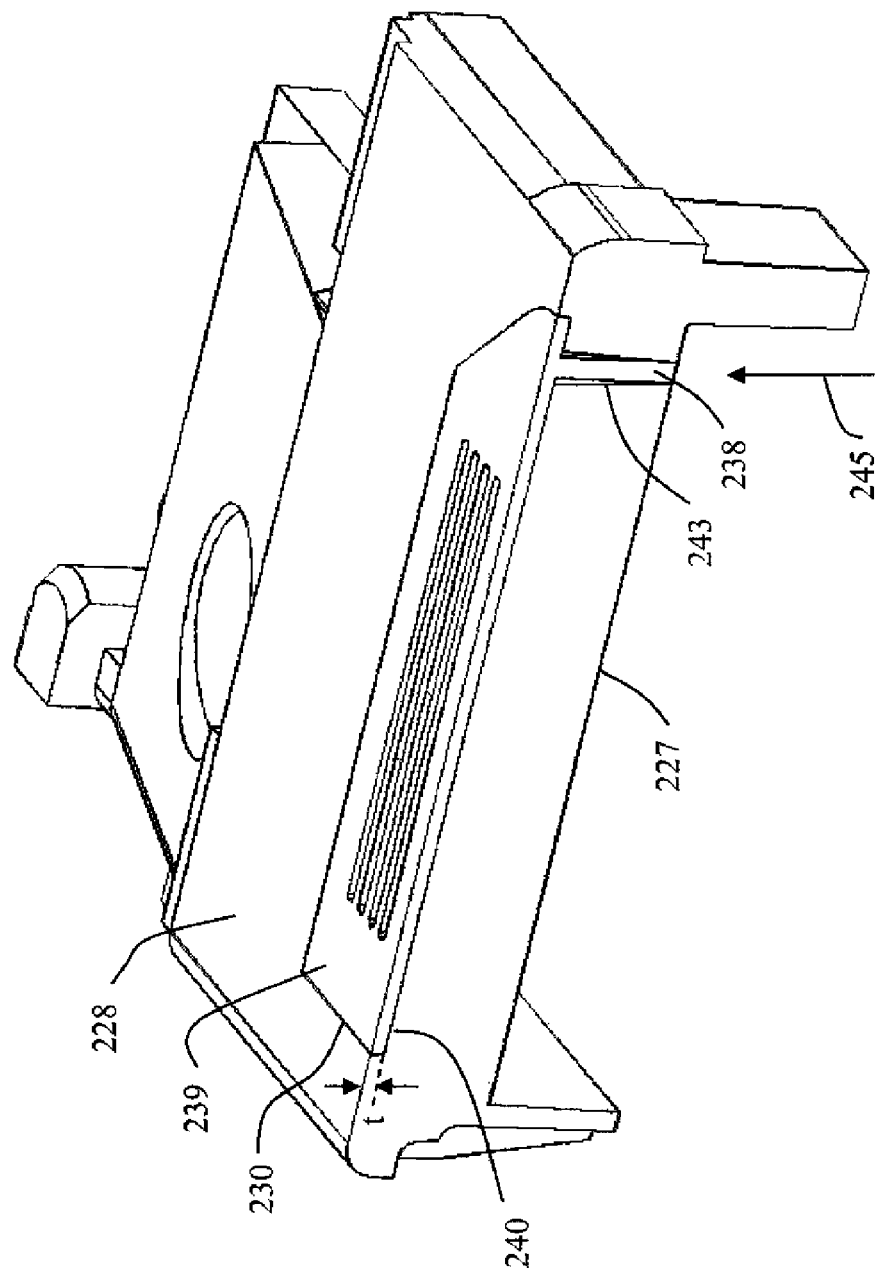
FIG. 8 is a cross-sectional view of the mounting substrate shown in FIG. 4.

Projection 238 from die-attach portion 230 is a result of injecting molten material in the second shot along injection direction 245 into injection hole 243 through a gate in the second cavity of the mold tool, and, as a result, projection 238 fills injection hole 243. (See FIG. 5 and also FIG. 8, which is a cross-sectional along dashed line 8A-8A of FIG. 4.) Preferably there is a single gate through which the second-shot molten material is injected into the second cavity to form die-attach portion 230, and preferably that gate (corresponding to injection hole 243 and projection 238) is near a first end 237 of fluid passageway portion(s) 233. In this way, the molten material flows along the single direction shown by the arrow indicated by length dimension L. Alternatively, if there are gates at both first end 237 and second end 247 (opposite first end 237) of the fluid passageway portion(s) 233, injected molten material would flow from both directions and form an undesirable knit line midway down the length of the lands between adjacent slots in the first and second sets of fluid feed slots 231 and 232. In some embodiments injecting the molten material through injection hole 243 from the bottom side surface 227 is advantageous because it results in a flatter surface on the die-attach surface of die-attach portion 230.

In the examples shown in FIGS. 4, 5 and 7, the width of the die-attach portion 230 is tapered near the first end 237 of fluid passageway portion(s) 233, i.e. near injection hole 243. Such a shape can be advantageous for improving the flow of molten material during the second shot mold step.

Figure 9:
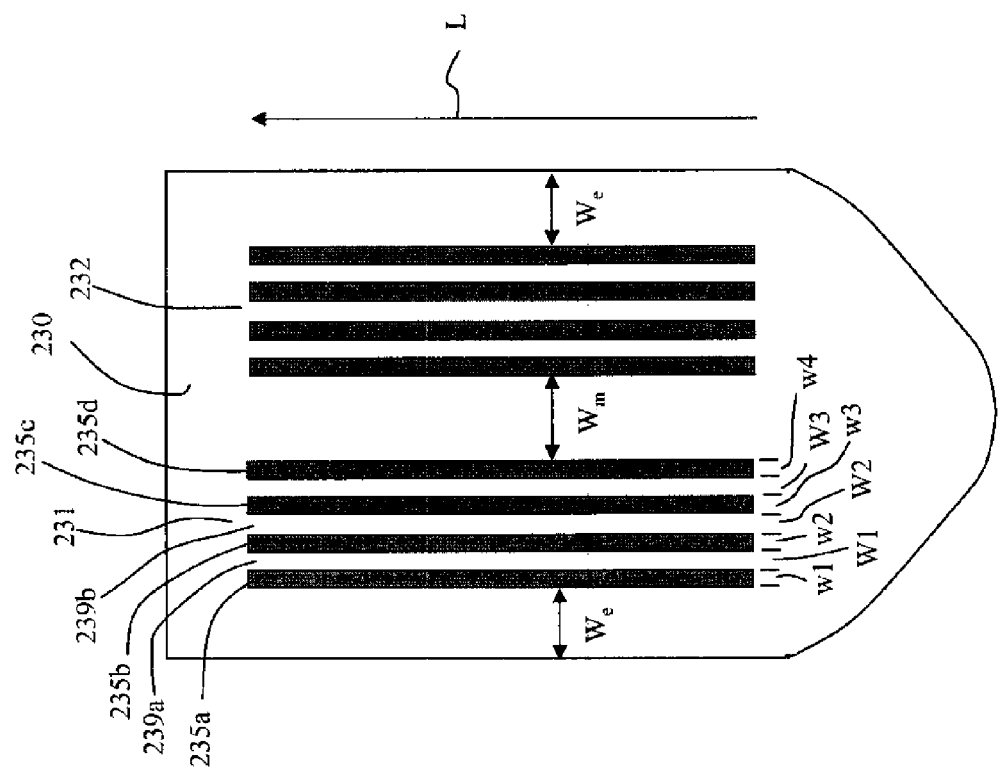
FIG. 9 is a schematic top view of the die-attach portion of the mounting substrate shown in FIG. 4.

FIG. 9 shows a schematic top view of die-attach portion 230. First set of fluid feed slots 231 includes first fluid feed slot 235a, second fluid feed slot 235b, third fluid feed slot 235c and fourth fluid feed slot 235d, all extending along a length direction L. First fluid feed slot 235a has a slot width w1 and adjacent second fluid feed slot 235b has a slot width w2. The land 239a (or first wall) between first fluid feed slot 235a and second fluid feed slot 235b has a wall width W1. A second land 239b (or second wall) that is adjacent to second fluid feed slot 235b is opposite to the first wall and has a wall width W2. In some embodiments, all of the slot widths are equal (i.e. w1=w2=w3=w4, etc.), and in some embodiments, all of the wall widths are equal (i.e. W1=W2=W3, etc.). In still other embodiments, each of the slot widths are equal to each of the wall widths (i.e. w1=w2=w3=w4=W1=W2=W3, etc.). In general the slot widths and wall widths are designed to have good fluid flow through the fluid feed slots, and good adhesive sealing on the lands (or walls) between the fluid feed slots at the surface of die-attach portion 230, when the printhead die 252 is (are) attached to prevent fluid from leaking from one slot to another slot. In some embodiments, the slot widths are not exactly equal to the wall widths, but slot width w1 is greater than 80% of wall width W1 and less than 120% of wall width W1, for example. In some embodiments, the wall widths are not all exactly equal to each other, but wall width W1 is greater than 80% of wall width W2 and less than 120% of wall width W2, for example. The slot width and wall width dimensions also need to be designed to correspond to the center-to-center spacing "s" of the ink inlet slots (e.g. fluid inlets 123, 133, 143 and 153 of printhead die 252 with reference to FIG. 3).

As described below, in order to provide a low CTE along a direction parallel to a passageway direction (i.e. parallel to the fluid feed slots 235a, 235b, 235c and 235d, for example) using some types of liquid crystal polymer materials in the second shot of the two-shot molding process, it is advantageous for wall widths such as W1 to be less than about 0.6 mm.

Two-shot molding of mounting substrate 220 is particularly advantageous relative to other alternatives, when the center-to-center spacing of the ink inlet slots on the corresponding printhead die 252 to be attached to die-attach portion 230 is less than or equal to one millimeter. In apportioning the space on die-attach portion 230, it is advantageous if a slot width w1 of a first fluid feed slot 235a and a slot width w2 of a second fluid feed slot 235b are such that w1+w2 is less than one millimeter. It is further advantageous if (including the wall width W1 of the wall between the first fluid feed slot 235a and the second fluid feed slot 235b), W1+w1+w2 is less than 1.5 millimeter. Two-shot molding of mounting substrate 220 is not limited to center-to-center slot spacings between 0.8 and 1.0 mm, but can be used for center-to-center slot spacings as small as 0.4 mm.

In the examples shown in FIGS. 4, 6, 7 and 9, between the first set of fluid feed slots 231 and the second set of fluid feed slots 232 is a mid-region land area having a width $W_m$ that can be larger than the wall widths, such as W1, between adjacent fluid feed slots within a set of fluid feed slots. This land area between sets of fluid feed slots allows for a space to be between two printhead die 252 that will be attached to die-attach surface 239 of die-attach portion 230. However, in other embodiments where adjacent printhead die 252 are designed to be attached without a space between them, the land area between sets 231 and 232 of fluid feed slots can be substantially the same as a wall width, such as W1. In addition, the land area at the outside edges of the first set of fluid feed slots 231 and the second set of fluid feed slots can have a width $W_e$ that is larger than the wall width W1. As described below, in some embodiments it can be advantageous to provide features in the land areas in the mid region and the edge regions if $W_m$ or $W_e$ respectively are greater than 0.6 mm.

Figure 10:
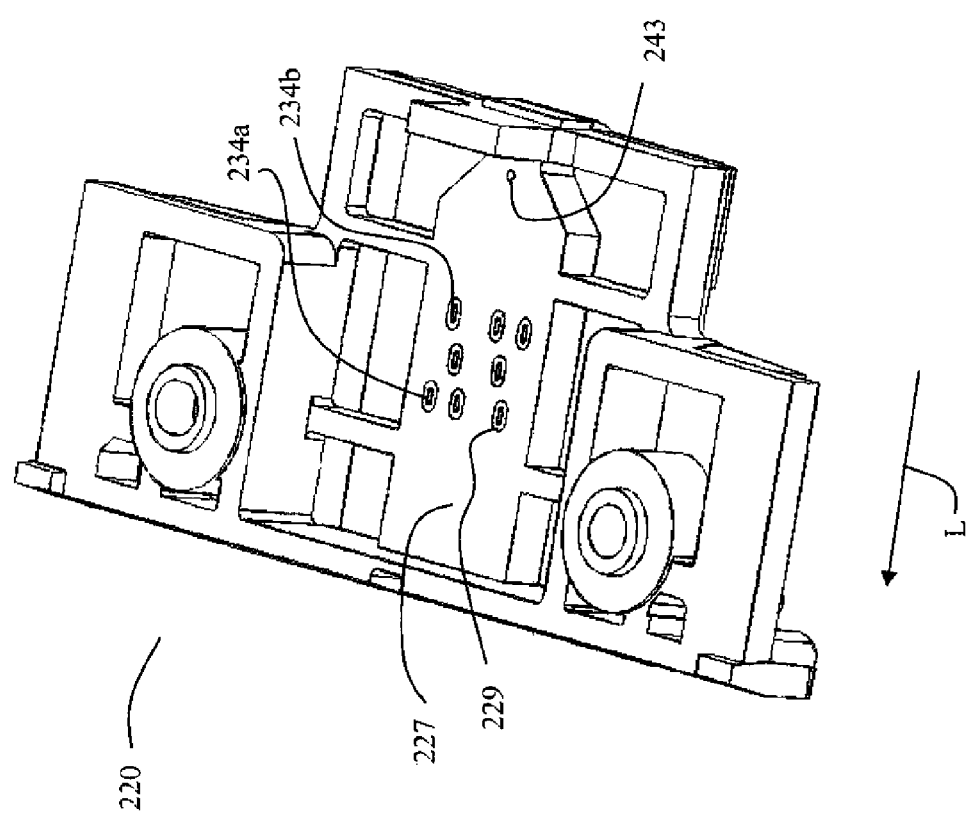
FIG. 10 is a perspective bottom view of the mounting substrate shown in FIG. 4.

FIG. 10 shows a bottom view of mounting substrate 220. Bottom side surface 227 of housing portion 222 is opposite the top surface of die-attach portion 230. Referring also to FIG. 7, first passageway 235a terminates at ink feed hole 234a and second passageway 235b terminates at ink feed hole 234b at second surface 229 of die-attach portion 230 near bottom side surface 227 of housing portion 222. Ink feed hole 234b is displaced from ink feed hole 234a along slot length direction L, and the other ink feed holes are similarly displaced from ink feed holes corresponding to adjacent passageways. Displacement of the ink feed holes makes it easier to reliably connect adjacent passageways to different fluid sources (not shown).

Figure 11:
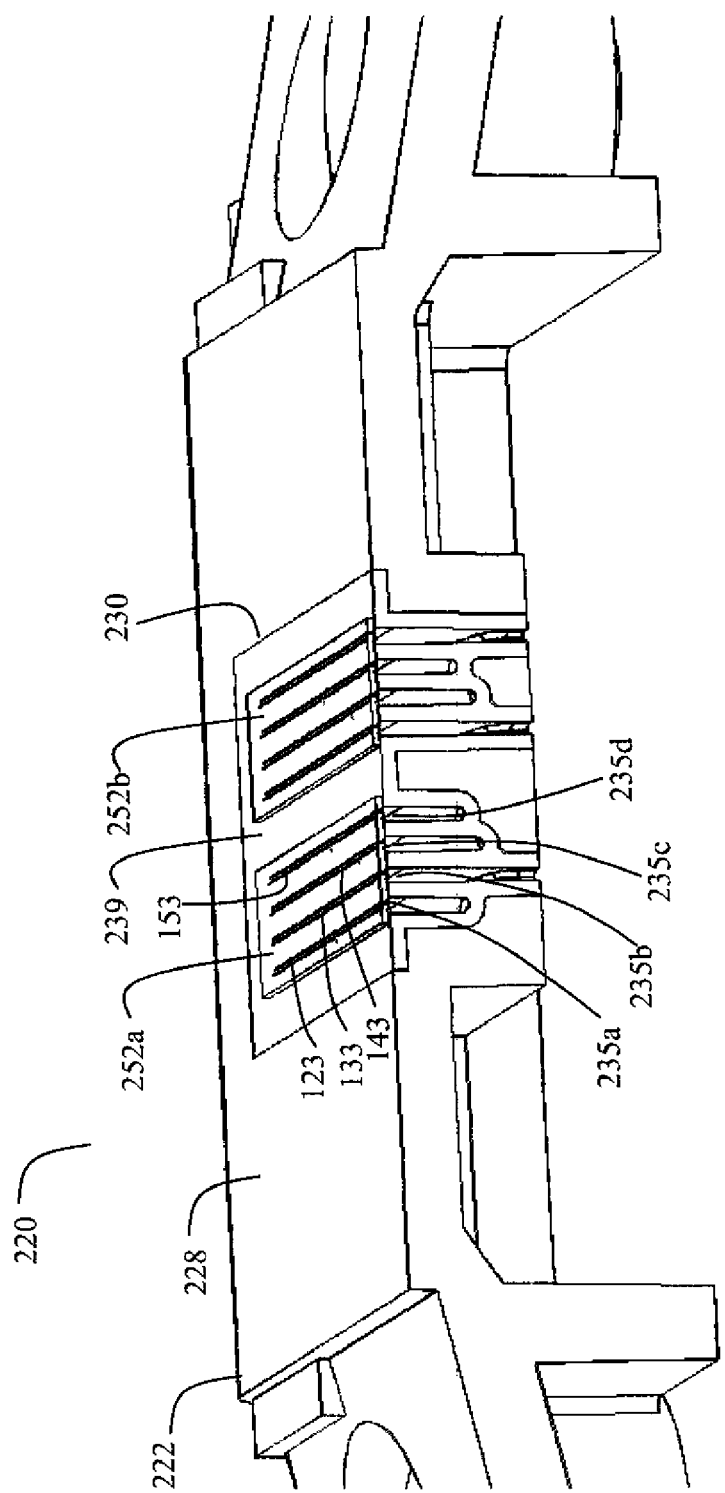
FIG. 11 is a cross-sectional view of the mounting substrate shown in FIG. 4 and two printhead die attached to it.
Figure 12:
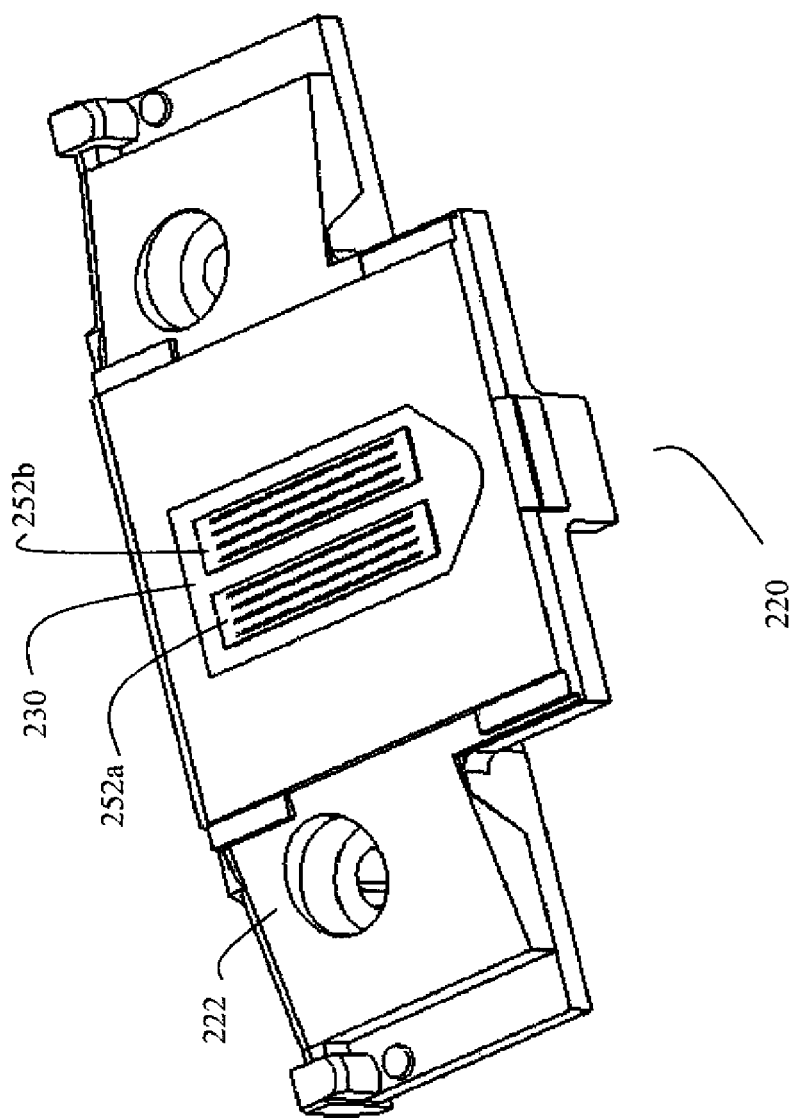
FIG. 12 is a perspective top view of the mounting substrate shown in FIG. 4 and two printhead die attached to it.

FIG. 11 shows an enlarged cross-sectional view of mounting substrate 220 similar to FIG. 6, but also including two printhead die 252a and 252b that are attached to die-attach portion 230. Note that fluid inlets 123, 133, 143 and 153 for first, second, third and fourth drop ejector arrays on printhead die 252a are respectively aligned with first, second, third and fourth fluid feed slots 235a, 235b, 235c and 235d in die-attach portion 230. FIG. 12 shows a perspective view of a fluid ejection assembly including two fluid ejection devices (i.e. printhead die 252a and 252b) attached to die-attach portion 230 of mounting substrate 220, according to an embodiment of this invention.

Figure 13A:
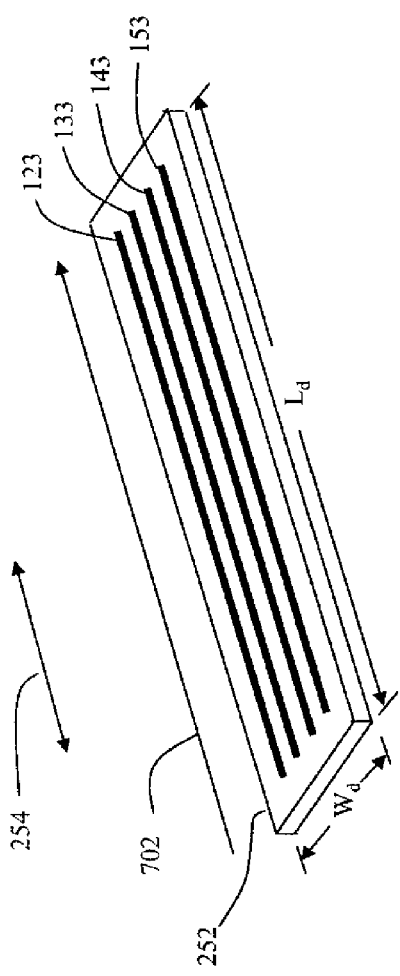
FIGS. 13A and 13B are a perspective view of an embodiment of the die attach portion of the mounting substrate.

With reference to FIGS. 3, 9, and 13A, the fluid inlets (i.e. slots 123, 133, 143 and 153) of printhead die 252a are fluidly coupled to passageways (i.e. fluid feed slots 235a, 235b, 235c and 235d respectively) when printhead die 252a is attached to the die-attach portion 230. The eight independent drop ejector arrays corresponding to the four fluid inlets on each of the two printhead die can be configured in a variety of ways. In some embodiments, the four drop ejector arrays on printhead die 252a eject cyan, magenta, yellow and black ink, and the four drop ejector arrays on printhead die 252b also eject cyan, magenta, yellow and black ink, and provide additional nozzles for forming the same sorts of spots on the recording medium as printhead die 252a. In other embodiments, some of the drop ejector arrays eject different sized drops, so that the eight drop ejector arrays provide both larger spots and smaller spots of cyan, magenta, yellow and black ink, for example. In other embodiments, some of the drop ejector arrays eject different color densities having the same hue, so that the eight drop ejector arrays provide light magenta, dark magenta, light cyan, dark cyan, black, gray, yellow, and protective fluid, for example. In other embodiments, additional color inks such as orange and green are among the eight inks that can be ejected, in order to extend the gamut of colors that can be printed. In still other embodiments, only one printhead die 252 is mounted on a die-attach portion 230 correspondingly having a total of only four fluid feed slots. In yet other embodiments, printhead die 252a and 252b include only three drop ejector arrays each, and the six inks that can be ejected include cyan, magenta, yellow, text black, photo black, and protective fluid.

In the embodiments described above, fluid feed slots 236 were configured as continuous long, narrow openings. However, it is also contemplated that the fluid feed slots could alternatively include ribs that extend across the width of the slot, in order to improve strength and stability, for example.

In the embodiments described above, the fluid feed slots 236 for providing different fluids were arranged parallel to one another. Some printhead die are configured with two or more drop ejector arrays for different color inks in line with each other. It is also contemplated to provide a mounting substrate having a die-attach portion configured for such types of printhead die, in which a first set of two or more of the independent fluid feed slots are parallel to one another, and a second set of two or more of the independent fluid feed slots are in line with the fluid feed slots of the first set.

A variety of different materials can be used to make the housing portion 222 and the die-attach portion 230 in the two-shot injection molding process, including thermosetting or thermoplastic resins. Materials can be selected based on the resulting strength and stability of the overall mounting substrate 220, as well as flatness and moldability of the fine features of the die-attach portion 230. Printhead die are made of silicon in some embodiments, and the material of the die-attach portion 230 can be chosen to have a low thermal expansion coefficient in order to provide low stress when the printhead die 252 are adhesively attached, as described below. The materials chosen should also be chemically inert to ink components, resist stress cracking, have good mechanical strength, and have relatively low cost. Liquid crystal polymers are a good choice in some embodiments. The material used to form the die-attach portion 230 may be chosen to be the same material used to form the housing portion 222, or it may be a different material. Good adhesion between the material used to form the die-attach portion 230 and the material used to form the housing portion 222 is desirable. In the case of different materials being used for forming the die attach portion 230 and the housing portion 222, chemical properties of the two materials, as well as the respective melt temperatures of the two materials can be factors in selecting materials that are compatible with the manufacturing process and that adhere well to one another. In addition, the recess 240 and segmented indentation(s) 241 and/or 242 can include features such as surface roughness to improve the adhesion of the die-attach portion 230 to the housing portion 222.

Although two-shot molding is sufficient for making the mounting substrate of the present invention, it is also contemplated that a multi-shot molding process can be used having more than two shots. One of the shots would be used to form a housing portion, and another of the shots would be used to form a die-attach portion of the mounting substrate.

Figure 13B:
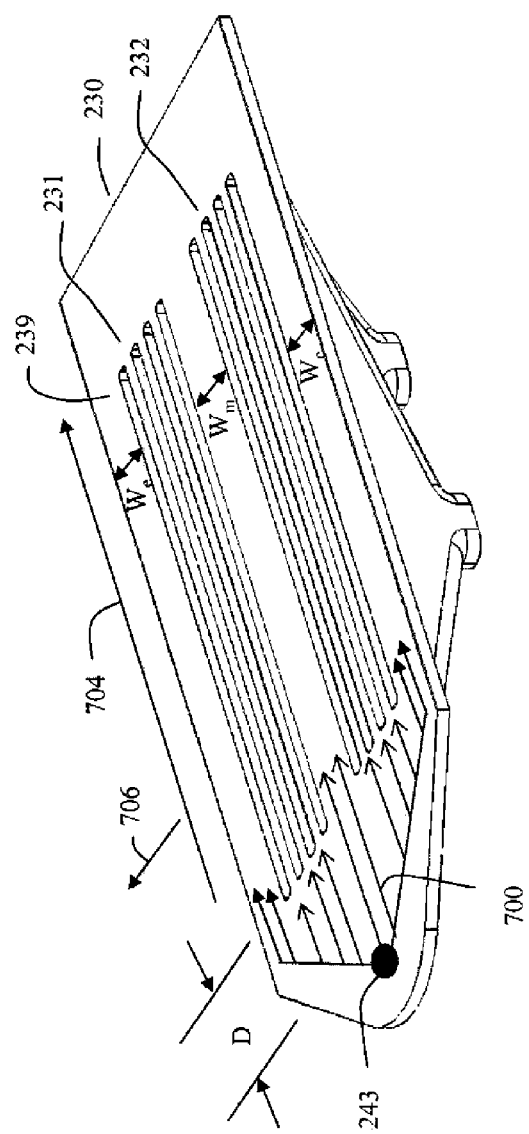

FIG. 13B schematically illustrates the flow of the plastic material after it is introduced through injection hole 243 of die attach portion 230 by way of arrows 700. Within the context of the present invention, CTE can be addressed when using the 2-shot molding process in conjunction with the proper choice of plastic materials. Some liquid crystal polymer materials have a highly anisotropic coefficient of expansion. For example a material like Vectra A130 made by Ticona has a CTE in the direction parallel to flow of 6 ppm/° C., but 23 ppm/° C. in the direction transverse to flow. In the present invention, a material like this can be selected for the 2nd shot of the substrate (which forms the die attach portion 230). By carefully designing the 2nd shot of the substrate such that the flow 700 in the die attach portion of the substrate is parallel to the long direction 702 (FIG. 13A) of the silicon die, the low CTE value will dominate in the long direction 702 of the silicon die, and the stresses induced when the die is mounted to the substrate will remain low. In FIG. 13A, only one of two silicon printhead die 252 that are to be bonded to the die-attach surface 239 of die-attach portion 230 is shown.

From elastic theory it can be shown for two rectangular materials having dissimilar CTE's and rigidly bonded together, the maximum deflection due to thermal stress is proportional to the difference in CTE values, to the change in temperature from the temperature at which stress is 0 (e.g. the temperature at which the rigid bond is formed), and to the square of the length of the materials along the bond. Although the simple assumptions in that calculation do not all strictly apply to a slotted printhead die bonded to a die mounting substrate having a complex shape (and perhaps with an adhesive that is capable of taking up some of the strain), it is still true that factors in the amount of thermal stress on the die will be the length of the printhead die, the difference in CTE along the long dimension of the bond, and the change in temperature between the bond curing temperature and ambient temperature.

In many embodiments, such as those shown in FIGS. 2 and 13A, 13B there are a plurality of printhead die 251 or 252. Each of the printhead die contains one or more of the arrays of drop ejectors in printhead 250 (FIG. 2). The length $L_d$ of printhead die 251 or 252 parallel to array direction 254 is largely determined by how many drop ejectors are provided on the die along array direction 254. For typical printhead die, $L_d$ (FIG. 13A) can be between 10 mm and 25 mm, although lengths outside this range are also possible. The width $W_d$ of a typical printhead die perpendicular to array direction 254 is largely determined by the minimum feature sizes in the wafer fabrication process, as well as the number of drop ejector arrays on the die. A typical $W_d$ can be between 2 mm and 12 mm, although widths outside this range are also possible. For many printhead die, length dimension $L_d$ is greater than twice the width dimension $W_d$.

With reference to FIGS. 13A, 13B, because the fluid passageways provided by fluid feed slots (e.g. in sets 231 and 232 of fluid feed slots) disposed along a passageway direction 704 that is parallel to array direction 254, and because the longer length dimension $L_d$ of the printhead die 252 is also parallel to the array direction, from the above discussion, it is apparent that it is advantageous to have the CTE of die attach portion 230 in a direction parallel to passageway direction 704 to be reasonably close to the CTE of silicon (~3 ppm/° C.). Because the width dimension $W_d$ of printhead die in a direction perpendicular to the array direction tends to be somewhat less than the length dimension $L_d$, it is less important for the CTE of die attach portion 230 in a direction perpendicular to passageway direction 704 to be close to the CTE of silicon.

A further reason why it is less important for the CTE of die attach portion 230 in a direction perpendicular to passageway direction 704 to be close to the CTE of silicon is that the passageways themselves (and the fluid inlets in the printhead die, i.e. slots 123, 133, 143 and 153) provide strain relief along this direction. So even for die where $L_d$ is not greater than twice $W_d$, it is still typically more advantageous for the CTE of die attach portion 230 along the passageway direction 704 to be close to that of silicon, and less important for this to be true perpendicular to the passageway direction 704. For example, in a preferred embodiment the CTE for the material would be less than 10 parts per million per degree C. (and more preferably less than 8 parts per million per degree C.) along a direction parallel to a passageway direction 704 in the die attach portion 230. A material, such as some liquid crystal polymers, having an anisotropic CTE that satisfies this criteria along passageway direction 704, but has a CTE greater than 10 parts per million per degree C. (or even greater than 15 parts per million per degree C.) along a direction 706 that is perpendicular to the passageway direction 704 can be a good choice for using to mold the die attach portion 230. Particular liquid crystal polymer materials that have a CTE less than 10 ppm per degree C. parallel to an injection molding flow direction 700, but greater than 10 ppm per degree C. perpendicular to injection molding flow direction 700 include Vectra A130 manufactured by Ticona, Zenite 6330 manufactured by Dupont and Sumikasuper 5006L manufactured by Sumitomo. It is noted that not all liquid crystal polymers satisfy these criteria, but information on CTE in both directions are provided by various manufacturers.

Of course, there are other low CTE plastic materials which are filled with materials like ceramic or carbon and typically have a more isotropic CTE, but these materials are typically expensive and many of them shed particles (which can be incompatible for use in an inkjet application where fluids that must flow through the part can be ejected through extremely small nozzles). In addition, conventional plastics that are sufficiently heavily filled with low expansion fillers to provide a low expansion die attach surface are typically so heavily filled that they do not flow well into thin wall regions. As a result, such materials are typically not compatible with forming sets of fluid slots having close spacing between slots. By contrast, the use of liquid crystal polymers having a CTE of less than 10 ppm along the injection molding flow direction is advantageous for embodiments of this invention.

Figures 14A, 14B:
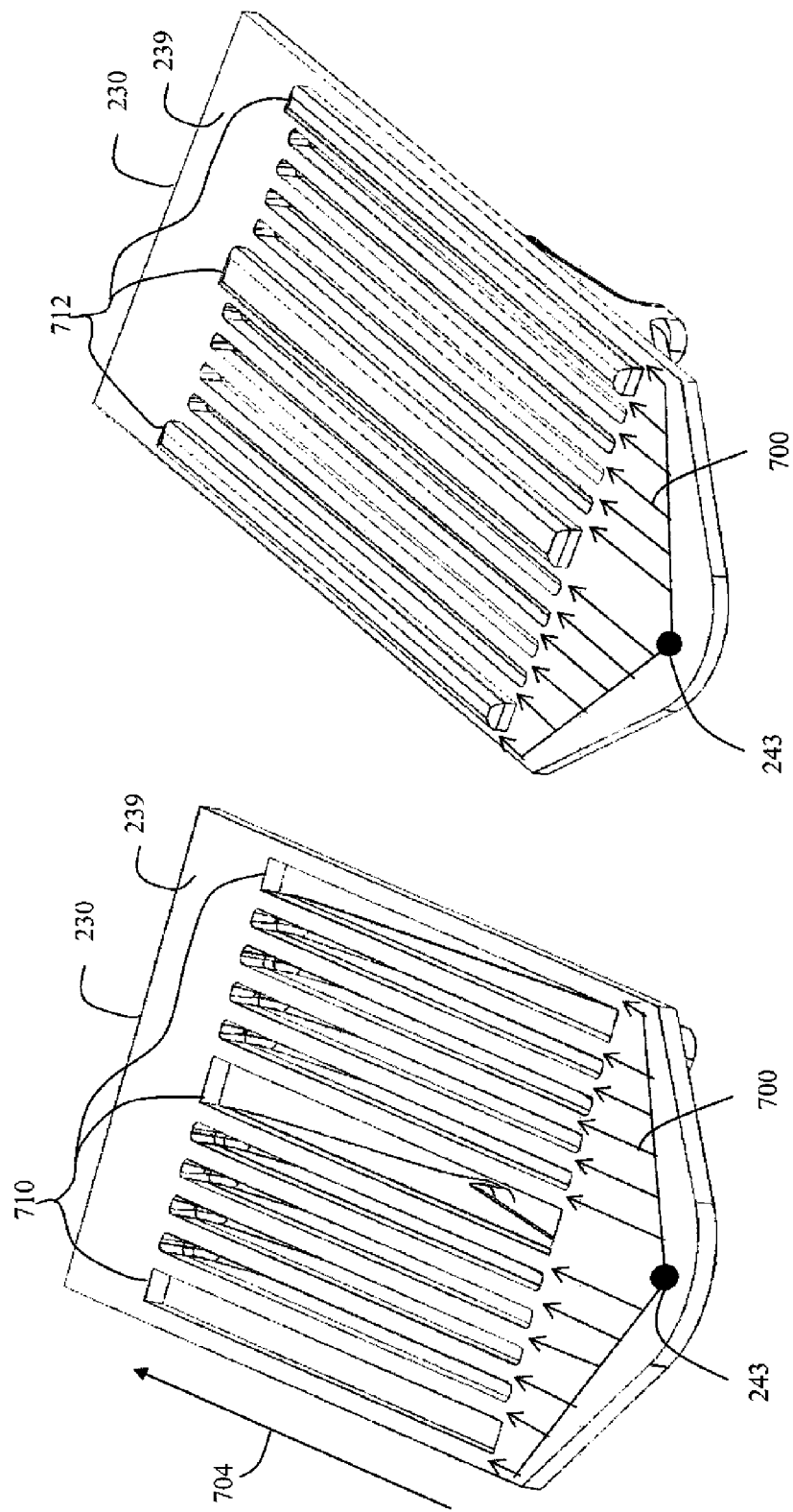
FIGS. 14A and 14B are perspective views of embodiments of the die attach portion of the mounting substrate.

For some liquid crystal polymers, the degree of anisotropy of the CTE depends on how completely the injection molding flow actually follows a single direction 700. It has been found for some liquid crystal polymers that the specified degree of anisotropy is not achieved unless the lands (e.g. 239a and 239b with reference to FIG. 8) between slots 235a, 235b and 235c have a width of less than about 0.6 mm. In the embodiment shown in FIGS. 9 and 13A, 13B, there is a wider middle portion having a width $W_m$ between the sets of fluid slots 231 and 232, and also wider outside edge portions having width $W_e$. For some liquid crystal polymers, if $W_m$ and $W_e$ are greater than about 0.6 mm, the specified degree of anisotropy is not achieved, and the CTE along the passageway direction 704 is not less than 10 ppm per degree C. In some cases the design of the die attach portion 230 of the mounting substrate may require that the region between some slots (for example when there are multiple silicon die) or the region between the outermost slots and the outside edge of the second shot die attach portion 230 are wider than the width (<0.6 mm) that is required to control flow direction. As shown in FIGS. 14A, 14B in a further aspect of the present invention, one or more features can be added to the second shot design of die attach portion 230 to keep the flow widths within the design parameters so that the flow direction is uniform throughout the entire top surface of the second shot. As shown in FIG. 14A, these features could be grooves 710 that either go partially or fully through the thickness of the second shot. Alternatively, in some embodiments as shown in FIG. 14B, the features could be projections 712 such as, for example, ribs extending outward from die-attach surface 239 along passageway direction 704. Grooves 710 or projections 712 can be located between the outermost slots and the edge of the die attach portion 230 on either side of the die attach portion. Additionally, a groove 710 or projection 712 can be located in the central area between the sets of fluid slots. The grooves 710 or projections 712, as shown in FIGS. 14A and 14B respectively, serve to control the flow of material in the direction 704 during the second shot molding so as to achieve sufficient anisotropy of CTE so that the CTE along passageway direction 704 is less than 10 ppm per degree C. (and preferably less than 8 ppm per degree C.). The grooves 710 or projections 712 are preferably disposed along the passageway direction 704, such that the distance between the groove or projection and an adjacent fluid slot or outside edge of die attach portion 230 is less than about 0.6 mm.

In embodiments of the present invention, the die attach surface flatness issue can be addressed by keeping the thickness t (with reference to FIGS. 7 and 8) of the top surface sufficiently thin (<1 mm) so that there will not be sink greater than the required surface flatness. In other words, the die-attach portion 230 includes a die-attach surface 239 and an interface opposite the die-attach surface 239, such that the interface is in contact with the housing portion 222, and such that a distance t between the die-attach surface 239 and the interface is less than 1 mm. Additionally, it beneficial to keep the gate location at hole 243 away from the area where the die will be placed, because there is typically sink on the surface directly above the gate location. The preferred distance D (with reference to FIG. 13B) between hole 243 and the nearby ends of fluid slots is dependent on the silicon die design, but D is typically in the range of 1-4 mm.

Maintaining the flatness of the die attach surface is beneficial because high stress is induced on the die when it is mounted to a surface that has poor flatness. This occurs for a non-flat surface during the die placement process when the die is pushed down against a non-uniform surface. It can also occur during die attach adhesive cure and even in use, because the adhesive bond-line thickness under the die is non-uniform due to the surface non-uniformity of a non-flat surface. This leads to non-uniform stress being exerted on the die which is higher in the regions under the die that have the thinnest adhesive bond line.

Another benefit of a material like liquid crystal polymer is that it can have a fairly high Deflection Temperature Under Load (DTUL). For example the DTUL of Vectra A130 is 235° C. compared to a material like Noryl GFN3 (commonly used in inkjet applications) which has a DTUL 138° C. This is beneficial because thermally cured polymers are used to attach the die to the substrate and to encapsulate the electrical connections to the die. These polymers typically cure at temperatures between 125° C.-180° C. and when the cure temperature gets close to the DTUL of the plastic used in the substrate, the mounting substrate will warp. When the mounting substrate warps, several things can occur that can be detrimental to an inkjet printhead. First, there is poor dimensional control of the critical dimensions on the substrate. Second, in an inkjet printhead there are certain features which are used to locate the printhead in the printer, such as alignment features 224 with reference to FIG. 4. When these dimensions are not controlled the image quality of the printer is degraded. Additionally, when the mounting substrate warps, it induces stress on the printhead die during the adhesive curing/cooling process and also in many cases when the mounting substrate is mounted to the rest of the printhead chassis 250 (FIG. 2).

The invention has been described in detail with particular reference to certain preferred embodiments thereof, but it will be understood that variations and modifications can be effected within the spirit and scope of the invention.

The invention claimed is:

1. A fluid ejection assembly for ejecting at least one fluid, the fluid ejection assembly comprising:
   a fluid ejection device including an array of drop ejectors with a corresponding fluid inlet; and
   an injection-molded mounting substrate for the fluid ejection device, wherein the injection-molded mounting substrate includes:
      a housing portion including a recess, the housing portion having been formed by a first shot molding; and
      a die-attach portion formed within the recess of the housing portion by a second shot molding, the die-attach portion including a passageway disposed along a passageway direction, the passageway being fluidly coupled to the fluid inlet of the fluid ejection device, wherein the die attach portion is made of a material having a coefficient of thermal expansion that is less than 10 parts per million per degree C. along a direction parallel to the passageway direction, and is greater than 10 parts per million per degree C. along a direction perpendicular to the passageway direction.

2. The fluid ejection assembly of claim 1, wherein the coefficient of thermal expansion of the material of the die-attach portion is less than 8 parts per million per degree C. along a direction parallel to the passageway direction, and wherein the coefficient of thermal expansion of the material of the die-attach portion is greater than 15 parts per million per degree C. along a direction perpendicular to the passageway direction.

3. The fluid ejection assembly of claim 1, wherein the array of drop ejectors is disposed along an array direction that is substantially parallel to the passageway direction, the fluid ejection device having a length dimension parallel to the array direction and a width dimension perpendicular to the array direction, wherein the length dimension is greater than twice the width dimension.

4. The fluid ejection assembly of claim 1, wherein the array of drop ejectors and corresponding fluid inlet is a first array of drop ejectors and a first fluid inlet disposed along an array direction, the fluid ejection device further comprising a second array of drop ejectors and a corresponding second fluid inlet disposed along the array direction, and the passageway in the die-attach portion being a first passageway, wherein the die-attach portion includes a second passageway disposed along the passageway direction, and wherein the second passageway is fluidly coupled to the second fluid inlet of the fluid ejection device.

5. The fluid ejection assembly of claim 4, wherein the die-attach portion further comprises a wall between the first passageway and the second passageway, the wall including a wall width W1, wherein W1<0.6 mm.

6. The fluid ejection assembly of claim 5, wherein the first passageway has a width w1 and the second passageway has a width w2, wherein w1+w2+W1<1.5 mm.

7. The fluid ejection assembly of claim 1, wherein one of a groove or an outward projection is disposed along the passageway direction, between the passageway and an outer edge of the die attach portion, and a distance between the passageway and the groove or the outward projection is less than 0.6 mm.

8. The fluid ejection assembly of claim 4, wherein the housing portion includes an injection hole for injection of material during the second shot molding.

9. The fluid ejection assembly of claim 8, wherein the first passageway has a first end and a second end opposite the first end, and the second passageway has a first end proximate to the first end of the first passageway, wherein the injection hole is disposed proximate the first ends of the first and second passageways.

10. The fluid ejection assembly of claim 9, wherein a distance between the injection hole and the first ends of the first and second passageways is greater than 1 mm.

11. The fluid ejection assembly of claim 1, wherein the die-attach portion is formed of a liquid crystal polymer material.

12. The fluid ejection assembly of claim 1, wherein the die-attach portion includes a die-attach surface and an interface opposite the die-attach surface, the interface being in contact with the housing portion, wherein a distance between the die-attach surface and the interface is less than 1 mm.

13. The fluid ejection assembly of claim 1, wherein the die-attach portion includes a deflection temperature under load that is greater than 200 degrees Centigrade.

14. The fluid ejection assembly of claim 1, the fluid ejection device being a first fluid ejection device including a first plurality of arrays of drop ejectors and a corresponding first plurality of fluid inlets, the fluid ejection assembly further comprising a second fluid ejection device including a second plurality of arrays of drop ejectors and a corresponding second plurality of fluid inlets, wherein the die-attach portion includes:
  a first plurality of passageways that are disposed along the passageway direction and that are fluidly connected to the first plurality of fluid inlets of the first fluid ejection device;
  and a second plurality of passageways that are disposed along the passageway direction and that are fluidly connected to the second plurality of fluid inlets of the second fluid ejection device.

15. The fluid ejection assembly of claim 14, the first fluid ejection device having a first length dimension that is substantially parallel to the passageway direction and a first width dimension that is substantially perpendicular to the passageway direction, and the second fluid ejection device having a second length dimension that is substantially parallel to the passageway direction and a second width dimension that is substantially perpendicular to the passageway direction, wherein the first length dimension is greater than twice the first width dimension, and wherein the second length dimension is greater than twice the second width dimension.

16. An inkjet printer including an inkjet printhead for ejecting at least one ink, the inkjet printhead comprising:
  a printhead die including an array of drop ejectors with a corresponding ink inlet; and
  an injection-molded mounting substrate for the printhead die, wherein the injection-molded mounting substrate includes:
    a housing portion including a recess, the housing portion having been formed by a first shot molding; and
    a die-attach portion formed within the recess of the housing portion by a second shot molding, the die-attach portion including a passageway disposed along a passageway direction, the passageway being fluidly coupled to the ink inlet of the printhead die, wherein a coefficient of thermal expansion of the die-attach portion is less than 10 parts per million per degree C. along a direction parallel to the passageway direction, and wherein a coefficient of thermal expansion of the die-attach portion is greater than 10 parts per million per degree C. along a direction perpendicular to the passageway direction.

17. The printer of claim 16, wherein the printhead die comprises a substrate formed of silicon.

18. A fluid ejection assembly for ejecting at least one fluid, the fluid ejection assembly comprising:
  a fluid ejection device including an array of drop ejectors with a corresponding fluid inlet; and
  an injection-molded mounting substrate for the fluid ejection device, wherein the injection-molded mounting substrate includes:
    a housing portion including a recess, the housing portion having been formed by a first shot molding; and
    a die-attach portion formed within the recess of the housing portion by a second shot molding, the die-attach portion including a passageway disposed along a passageway direction, the passageway being fluidly coupled to the fluid inlet of the fluid ejection device, wherein the die attach portion is made of a material having a coefficient of thermal expansion that is less than 10 parts per million per degree C. along a direction parallel to the passageway direction, and is greater than 10 parts per million per degree C. along a direction perpendicular to the passageway direction, said die attach portion further comprising at least one feature associated with a surface of said die attach portion that is adapted to control a flow of the material during the second shot molding.

19. A method for manufacturing a mounting substrate for a fluid ejection assembly, the method comprising:
  molding a housing portion of a mounting substrate using a first shot of a two-shot injection molding process, the housing portion including a recess and an injection hole;
  injecting a liquid crystal polymer through the injection hole of the housing portion to form a die-attach portion within the recess of the housing portion using a second shot of the two-shot molding process, the die-attach portion including a passageway including a first end and a second end opposite the first end, wherein the first end of the passageway is proximate to the injection hole of the housing portion and the second end of the passageway is distal to the injection hole of the housing portion, and wherein a coefficient of thermal expansion of the die attach portion along a direction of the passageway is less than 10 parts per million per degree C.

20. A method for manufacturing a fluid ejection assembly, the method comprising:
  molding a housing portion of a mounting substrate using a first shot of a two-shot injection molding process, the housing portion including a recess and an injection hole;
  injecting a liquid crystal polymer through the injection hole of the housing portion to form a die-attach portion within the recess of the housing portion using a second shot of the two-shot molding process, the die-attach portion including a passageway including a first end and a second end opposite the first end, wherein the first end of the passageway is proximate to the injection hole of the housing portion and the second end of the passageway is distal to the injection hole of the housing portion, and wherein a coefficient of thermal expansion of the die attach portion along a direction of the passageway is less than 10 parts per million per degree C.;
  providing a fluid ejection device including an array of drop ejectors with a corresponding fluid inlet; and
  affixing the fluid ejection device to the die-attach portion of the mounting substrate such that the passageway is fluidly coupled to the fluid inlet.

* * * * *